United States Patent
Zhu et al.

(10) Patent No.: US 6,287,698 B1
(45) Date of Patent: *Sep. 11, 2001

(54) PROCESS FOR IMPROVING HYDROLYSIS RESISTANCE OF POLYURETHANE DISPERSION ADHESIVES AND BONDED ASSEMBLIES PRODUCED THEREFROM

(75) Inventors: Yuduo Zhu, Woodbury, MN (US); Robert J. Duff, Blacksburg, VA (US); Peter Gottschalk, Maplewood; Brian L. Marty, Oakdale, both of MN (US)

(73) Assignee: H. B. Fuller Licensing & Financing, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,867

(22) Filed: Dec. 8, 1998

(51) Int. Cl.⁷ .................................................. B32B 27/40
(52) U.S. Cl. .................................. 428/424.4; 428/424.2; 428/414; 428/217; 428/308.4; 36/30 R
(58) Field of Search ........................ 428/217, 422.8, 428/414, 424.2, 424.4, 308.4, 318.4, 319.3; 36/30 R

(56) References Cited

U.S. PATENT DOCUMENTS

| | | | |
|---|---|---|---|
| 4,676,010 | * 6/1987 | Cheskin | 36/32 R |
| 4,870,129 | 9/1989 | Henning et al. | 524/597 |
| 5,334,690 | 8/1994 | Schafheutle et al. | 528/71 |
| 5,432,228 | 7/1995 | Hilken et al. | 524/591 |
| 5,494,960 | 2/1996 | Rolando et al. | 524/591 |
| 5,523,344 | * 6/1996 | Maksymkiw et al. | 524/507 |
| 5,532,058 | 7/1996 | Rolando et al. | 428/341 |
| 5,608,000 | 3/1997 | Duan et al. | 524/591 |
| 5,608,232 | 3/1997 | Yamazaki et al. | 257/66 |
| 5,610,232 | 3/1997 | Duan et al. | 524/840 |
| 5,637,639 | 6/1997 | Duan et al. | 524/591 |
| 6,008,286 | * 12/1999 | Groves | 524/505 |

FOREIGN PATENT DOCUMENTS

| | | |
|---|---|---|
| 3930352 | 3/1991 | (DE) . |
| 0 542 160 A | 11/1992 | (EP) . |
| 1 295 677 A | 11/1972 | (GB) . |
| 96 40811 A | 12/1996 | (WO) . |
| 98 15601 A | 4/1998 | (WO) . |

* cited by examiner

Primary Examiner—Blaine Copenheaver
Assistant Examiner—Christopher Paulraj
(74) Attorney, Agent, or Firm—Nancy Quan Binsu

(57) ABSTRACT

A method of bonding two substrates at least one of which is a rubbery polymeric material having carbon-carbon double bonds on the polymer backbone, the method comprising:

a) applying an aqueous polyurethane dispersion adhesive composition to at least one of the substrates, the adhesive compostion further comprising an epoxy resin;

b) allowing the composition to dry; and then c) joining the substrates with heating to activate the adhesive. The substrates are suitably footwear materials such as a molded rubber outer sole which has been first primed with a chlorinating primer, and a foam midsole of a material such as a lightly crosslinked ethylene vinyl acetate. The process results in bonded assemblies having improved humidity resistance.

15 Claims, No Drawings

PROCESS FOR IMPROVING HYDROLYSIS RESISTANCE OF POLYURETHANE DISPERSION ADHESIVES AND BONDED ASSEMBLIES PRODUCED THEREFROM

BACKGROUND OF THE INVENTION

Polyurethane dispersion (PUD) adhesives have been developed in recent years as an alternative to solvent-based adhesives. Typically the dispersion is prepared by dispersing an isocyanate functional prepolymer in aqueous media, and chain extending the prepolymer after it is dispersed. Compatibility is conventionally provided by means of ionic groups such as carboxylate or sulfonate groups, or both, provided on the backbone of the polyurethane polymer. Addition of crosslinkers, such as isocyanates, aziridines, melamine resins, epoxies, oxazolines or carbodiimides at the time of use to improve bond strength is known and effective. However, substitution of polyurethane dispersion adhesives for solvent-based adhesives in specific applications often presents a potential user with special problems.

References describing polyurethane dispersion adhesives include U.S. Pat. No. 4,870,129; U.S. Pat. No. 5,334,690; U.S. Pat. No. 5,432,228; U.S. Pat. 5,494,960; U.S. Pat. No. 5,523,344; U.S. Pat. No. 5,532,058; U.S. Pat. No. 5,608,232; U.S. Pat. No. 5,610,232; U.S. application Ser. No. 08/561197 filed Nov. 21 1995, allowed (equivalent to WO97/19121); U.S. application Ser. No. 08/961,752, filed Oct. 31 1997; and DE 3930352, all incorporated herein by reference.

PUD adhesives offer several advantages over solvent based polyurethane adhesives such as low VOC, less odor, less hazard of fire, explosion or acute toxic reaction, greater acceptability from an environmental perspective and ease of handling. On the other hand PUD adhesives have drawbacks, such as lower water resistance, chemical resistance and heat resistance. To date the primary approach to overcoming these drawbacks is to use a polyisocyanate crosslinker.

In bonding rubbery materials to themselves, or to other substrates commonly found in footwear, it is conventional practice to apply a primer of a chlorinating compound, typically trichloroisocyanuric acid to the rubbery substrate (s). Application of the primer has been found to consistently provide bonds which fail by a substrate failure mode, rather than an adhesive failure mode. Use of this type of primer is conventional with solvent adhesives and provides similar benefits for polyurethane dispersion adhesives aged in limited humidity environments.

In bonding footwear rubber materials it has been found that isocyanate crosslinked PUDs made will give excellent T-peel bond strengths when aged in limited humidity (50%) environments, but that strength significantly deteriorates upon ageing in high humidity and high temperature environments. This problem is found with PUDs which contain carboxylate groups, sulfonate groups or mixtures of both as aqueous compatibilizing agents.

SUMMARY OF THE INVENTION

It has now been found that humidity resistance of bonded assemblies comprising a footwear rubber bonded with a polyurethane dispersion adhesive can be substantially improved when an epoxy functional compound is employed as the crosslinker.

In one aspect, therefore the invention is a method of bonding two substrates, at least one of which is a rubbery polymeric material having carbon-carbon double bonds on the polymer backbone, the method comprising:
   a) applying an aqueous polyurethane dispersion adhesive composition to at least one of the substrates, the adhesive composition further comprising an epoxy resin;
   b) allowing the composition to dry; and then
   c) joining the substrates with heating to activate the adhesive.

The process is particularity advantageous when the rubbery material has been first primed with a chlorinating primer, especially when it is desired for the adhesive to be applied to the rubbery substrate promptly after the primer has dried.

In a further aspect, the invention is a bonded assembly comprising two substrates at least one of which is a rubbery polymeric material having carbon-carbon double bonds on the polymer backbone bonded by an adhesive therebetween, wherein the adhesive is a dried aqueous polyurethane dispersion adhesive composition, the adhesive composition further comprising an epoxy resin. Preferred bonded assemblies are laminates of molded rubbery material outer soles and molded foam midsoles for human footwear.

DETAILED DESCRIPTION OF THE INVENTION

Unless otherwise stated, references to percentages and parts herein are determined relative to the weight of the referenced composition.

Polyurethane dispersions which may be employed in the invention are typically formed by dispersing an isocyanate functional polyester polyurethane having ionic carboxylate and/or sulfonate groups, and then extending the polymer after dispersion by reaction of the isocyanate group with water or an amine. Such dispersions are described in U.S. Pat. No. 4,870,129; U.S. Pat. No. 5,334,690; U.S. Pat. No. 5,432,228; U.S. Pat. No. 5,494,960; U.S. Pat. No. 5,523,344; U.S. Pat. No. 5,532,058; U.S. Pat. No. 5,608,232; U.S. Pat. No. 5,610,232; U.S. application Ser. No. 08/561197 filed Nov. 21,1995, allowed (equivalent to WO97/19121); U.S. application Ser. No. 08/961,752, filed Oct. 31,1997; and DE 3930352. Commercial products include Dispercoll U KA-8464 sold by Bayer Corp. and FI-4000 and FI-4200 sold by H. B. Fuller Corp.

At least one of the substrates is a rubbery material, desireably a rubber having carbon-carbon double bonds in the polymer backbone. Suitable rubbery materials include styrene-butadicne rubber (SBR), styrene-butadience-styrene (SBS), and styrene-isoprene-styrene (SIS) rubbers. For footwear materials these materials will typically have a Shore A hardness value in the range of 50–90. The mating substrate may be the same, or same type, of material but will typically be a different type of polymer material. Specific examples include phylon, a lightly crosslinked EVA (ethylene vinyl acetate copolymer) foam which has been compression or injection molded. Shore A hardness values for these systems typically range from 25–75. Typically these substrate materials are compounded to a footwear manufacturer's specification, supplied as pellet or sheets, and then injection or compression molded by the footwear manufacturer.

The adhesives are particularly useful in sole bonding operations employing cup-sole, welt and stitch-down constructions and can be used for attaching direct injection molded soles.

A conventional chlorinating primer is typically used on the rubbery material substrate. A suitable such primer is trichloroisocyanuric acid. The primer is conventionally applied from solution and the substrate allowed to dry before the adhesive is applied. A commercial primer solution suitable for this purpose is Icortin C 27F, sold by H. B. Fuller Corp.

According to the inventive process an epoxy compound is mixed with the PUD at the time of use. The mixed adhesive is then applied onto the primed substrate and allowed to dry. Preferably the epoxy compound is added in the form of a dispersion or neat liquid resin. Use of a dispersion facilitates ease of blending. Furthermore the pot-life of the mixed adhesive is prolonged if the epoxy and polyurethane components remain in separate micelles, which do not substantially interact until the adhesive has dried and coalesced. However, the epoxy compound may also be directly dispersed in the PUD, for instance by means of a high speed mixer, without departing from the invention hereof.

Examples of epoxy compound which may be used in the invention include di or trifunctional liquid resins, such as DER 331 from Dow, or Epalloy 7190N75, Erisys GE-30, Erisys GE-35 and Erisys GE-36, all from CVC Specialty Chemical Company. Epoxy dispersions of difunctional resins such as EPI-REZ 3510 W-60 and EPI-REZ 3515 W-60, or trifunctional resins such as EPI-REZ 5003 W-60, all sold by Shell, may also be used.

The epoxy compound is suitably added to the PUD in the form of a dispersion or liquid resin in an amount of from about 1 to about 10%, preferably 2–8%, and more preferably about 4–6% by weight (epoxy solids basis) of the adhesive.

A conventional isocyanate crosslinker may also be incorporated into the adhesive formulations. Examples of isocyanates which may be employed as co-crosslinkers are solvent based solutions of isocyanates such as Desmodur RFE from Bayer. Most preferably, water dispersible isocyanates such as XR-1375 or RK-6350 from H.B. Fuller Co. The isocyanate crosslinker will typically be employed in an amount of from about 1% to about 10%, preferably 2–8% and more preferably 4–6% by weight of the adhesive.

A compound having a plurality of primary and/or secondary amine groups can also be employed. The amine will co-react with the epoxy compound to further increase crosslink density. Examples of suitable plural amines are ethylenediamine propylenediamine, 1,4-butylenediamine, piperazine, 1,4 -cyclohexyldimethyldiamine, hexamethylenediamine N-methylpropylenediamine, diaminophenylsulfone, diaminodiphenylether, diaminodiphenyldimethylmethane, 2,4 -diamino-6-phenyltriazine, isophoronediamine, dimer fatty acid diamine, N-isodecycloxy propyl-1,3-diaminopropane and imidazolidinone functional diamines. Polyamine compounds having terminal primary amine groups as well as internal secondary amine groups, such as diethylene triamine, and triethylene tetraaminie may also be employed. Preferred plural amines are amino terminated polyalkyleneoxides such as Jeffamine ® products sold by Huntsman Corporation. The amine will typically be employed in an anmout of from about 0.1–5%, preferably 0.5–3%, more preferably 0.75–1.5% by weight of the adhesive.

Hydrolysis resistance of the bonded assembly is suitably determined according to industry standard test procedures such as the Hydrolysis Aging Test commonly used in testing athletic footwear. The invention has been demonstrated to give a remarkable improvement in bond strength retention under the conditions of this test, as described in the examples below.

It is surprising that the use of an epoxy crosslinker provides substantial improvement in hydrolysis resistance compared to an isocyinate crosslinker. Isocyanate crosslinkers provide urethane and/or urea linkages, functionalities which are also present in a high amount in the backbone polymer. Even if the linkages formed by the epoxy group provide a greater hydrolytic stability, the susceptibility of the polyurethane backbone to hydrolytic attack would be expected to remain. Without being bound thereby, it is believed that the epoxy compound acts as both a crosslinker for the PUD and as an acid scavenger. Acidic species are believed to be a potential cause of hydrolysis under high humidity conditions. A possible source of such groups may be degradation products of the chlorinating primer.

The adhesives, primers, and coatings of the invention may also include compounding additives. Compounding additives include thickening agents, surfactants, coalescing aids and plasticizers. A preferred associative thickening agent is DSX-1550 from Henkel Corporation. A preferred non-ionic surfactant is Pentex 99 from Rhone Poulenc. A preferred coalescing aid is Reentry KNI-2000 which is a terpene mixture from Environmental Solvents Corporation. Useful plasticizers are selected from the group consisting of alkyl and aryl sulfonamides, benzoates esters, phthalate esters, adipates, citrates and mixtures thereof. A preferred plasticizer is Uniplex 108 from Initex Chemical Corporation. When compounding additives are present in the formulations, their solids content can vary from about 0.5 parts to about 0 parts by weight, and preferably from about 0.5 parts to about 25 parts by weight., based on 100 parts total solids.

The blended adhesive formulations can be applied in one-side mode or two-side mode. In the one-side mode, the adhesive is applied to one of two substrates and dried. The adhesive is heat activated and the substrates are brought together with pressure. In the two-side mode, the adhesive is applied to both substrates, dried, then heat activated and brought together with pressure. It is possible, in both modes, to dry and heat activate the adhesive in the same step.

The invention is illustrated with the following non-limiting examples.

EXAMPLES 1, 2 AND COMPARATIVE EXAMPLES A&B

Rubber outsole materials and phylon midsoles were obtained from two different major footwear manufacturers. The outsole materials were labeled SBR1and SBR2, respectively. The outsole materials were bonded to the respective manufacturer's midsoles using FI-4000 PUD adhesive from H.B. Fuller Co., modified with a crosslinker.

The blended adhesive formulation was prepared by adding an epoxy resin in an amount of 5% by weight of the total adhesive weight, then mixed using a three blade impeller at moderate speed for 3 minutes. RK-6350 water-dispersable isocyanate hardener from H.B. Fuller Co. was added in an amount of 5% of the total adhesive weight, and mixed in the same manner. After mixing, the adhesive is ready to apply to the substrates. Control adhesives were prepared in the same way except that the epoxy resin was omitted.

The Phylon midsole was solvent wiped with methyl ethyl ketone, then coated with a thin coat of Isamix 9078X a UV primer from H.B. Fuller Company. The primer was allowed to dry at ambient for 20 minutes then the primed pieces of Phylon were irradiated with UV light between 0.5 and 1.0 J/cm$^2$. The blended adhesive formulation was then brush applied as a thin coating.

The SBR rubber material was roughened and then coated with Icortin C 27 F, a chlorinating agent available from H.B.

Fuller Company. The treated rubber was allowed to dry at ambient for 15 minutes, then oven dried for 2 minutes at 55° C. The adhesive was then brush applied as a thin coating.

While still wet, the rubber and Phylon substrates coated with adhesive formulation were dried in an oven at 55° C. for approximately 4–5 minutes, heat reactivated under an IR lamp to a surface temperature of 65–75° C., and then mated by pressing together for 15 seconds at 50 psi. The samples were then subjected to Hydrolysis Aging Conditions as follows:

1) Age samples at 21 degrees C., 50% relative humidity for 5 days,

2) Age samples at 70 degrees C., 95% relative humidity for 7 days,

3) Age samples at 21 degrees C., 50 % relative humidity for 2 days.

The humidity chamber used for this test operated at ambient pressure. Control bonds not subjected to Hydrolysis Aging Conditions were simply stored at 21 degrees C., 50% relative humidity for the duration of the Hydrolysis Aging test.

Upon completion of the acing period, the average peel values in T-peel mode, using a crosshead speed of 100 mm/min, were determined. Results are provided in Table 1 where Examples A and B are controls and Examples 1 and 2 are invention examples.

TABLE 1

| Example | Adhesive System | Substrates | T-peel, aged at 21° C./ 50% RH | T-peel hydrolysis aged |
|---------|-----------------|------------|-------------------------------|------------------------|
| A | FI-4000 PUD & RK-6350 (isocyanate hardener) | Phylon-SBR1 | 17.2 pli (substrate failure on Phylon) | 14.8 pli (adhesive failure to rubber) |
| 1 | FI-4000 PUD & RK-6350 (isocyanate hardener) & D.E.R. 331 (epoxy resin) | Phylon-SBR1 | 17.8 pli (substrate failure on Phylon) | 18.0 pli (substrate failure on Phylon) |
| B | FI-4000 PUD & RK-6350 (isocyanate hardener) | Phylon-SBR2 | 20.5 pli (substrate failure on Phylon) | 9.3 pli (adhesive failure to rubber) |
| 2 | FI-4000 PUD & RK-6350 (isocyanate hardener) & D.E.R. 331 (epoxy resin) | Phylon-SBR2 | 21.1 pli (substrate failure on Phylon) | 20.8 pli (substrate failure on Phylon) |

COMPARATIVE EXAMPLES C & D AND INVENTION EXAMPLES 3–6

The procedure of the previous examples was repeated on Phylon—SBR1 substrates using as controls, FI-4000 PUD alone and blended with RK-6350 isocyanate crosslinker (Examples C and D) and as invention examples, four epoxy-containing blends (Examples 3–6). Details of the formulations and Hysdrolysis Aging test results are given in Table 2.

TABLE 2

| Components | % Composition | | | | | |
|---|---|---|---|---|---|---|
| Example | C | D | 3 | 4 | 5 | 6 |
| FI-4000 | 100 | 95 | 91 | 77 | 77 | 92 |
| RK-6350 | | 5 | 4 | 8 | 5 | |
| D.E.R. 331 (epoxy resin) | | | 5 | 5 | | 8 |
| EPI-REX 3510-W-60 (epoxy dispersion) | | | | 5 | 10 | 10 |
| Peel Values after Hydrolysis Test in pounds per inch (Failure Mode) | 4.8 (AF) | 14.8 (AF) | 17.8 (SF) | 16.9 (SF) | 16.2 (SF) | 17.6 (SF) |

It can be seen from Table 2 that those formulations which contain epoxy additives generally give higher peel values, and more importantly, give substrate failure of the phylon as the mode of failure.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A bonded assembly comprising first and second substrates bonded by an adhesive therebetween, wherein at least the first substrate is a rubbery polymeric material having carbon-carbon double bonds on the polymer backbone and treated with a chlorinating primer prior to being brought into contact with said adhesive, and wherein the adhesive comprises a dried aqueous polyurethane dispersion composition and an epoxy resin and exhibits hydrolysis resistance after being subjected to aging at 70°C. and 95% relative humidity for 7 days.

2. A bonded assembly as in claim 1 wherein the chlorinating primer comprises trichloroisocyanuric acid.

3. A bonded assembly as in claim 1 wherein the adhesive composition further comprises an isocyanate crosslinker in an amount of from about 1% to about 10% by weight of the adhesive composition.

4. A bonded assembly as in claim 1 wherein the adhesive composition further comprises a compound having a plurality of primary and/or secondary amine groups in an amount of from about 0.1% to about 5% by weight of the adhesive compsition.

5. A bonded assembly as in claim 1 wherein the rubbery polymeric material is selected from the group consisting of styrene-butadiene rubber (SBR), styrene-butadiene-styrene (SBS), and styrene-isoprene-styrene (SIS) rubbers.

6. A bonded assembly as in claim 1 wherein the rubbery polymeric material has a Shore A hardness value in the range of 50–90.

7. A bonded assembly as in claim 1 wherein the second of said substrates is a polymeric foam material.

8. A bonded assembly as in claim 7, wherein the polymeric foam material comprises an ethylene vinyl acetalte polymer.

9. A bonded assembly as in claim 1 wherein the second of said substrates has a Shore A hardness value of 25–75.

10. A bonded assembly as in claim 1 wherein the assembly is an item of human footwear, said first substrate is a molded outer sole and said second substrate is a molded foam midsole.

11. A bonded assembly as in claim 1, wherein the epoxy resin is in an amount of from about 1 to about 10% by weight of the adhesive.

12. A bonded assembly as in claim 11, wherein the epoxy resin is in an amount of from about 2 to about 8% by weight of the adhesive.

13. A bonded assembly as in claim 12, wherein the epoxy resin is in an amount of from about 4 to about 6% by weight of the adhesive.

14. A bonded assembly as in claim 1, said adhesive exhibiting a first peel value after aging at ambient conditions and a second peel value after aging at 70° C. and 95% relative humidity for 7 days, said first peel value and said second peel value being substantially the same.

15. A bonded assembly comprising first and second substrates bonded by an adhesive therebetween, at least the first substrate being a rubbery polymeric material having carbon-carbon double bonds on the polymer backbone and treated with a chlorinating primer, the adhesive comprising a dried aqueous polyurethane dispersion composition, an epoxy resin and an isocyanate crosslinker and exhibiting a first peel value after being aged at ambient conditions and a second peel value after being aged at 70° C. and 95% relative humidity for 7 days, said first peel value and said second peel value being substantially the same.

* * * * *